(12) United States Patent
Puniello (10) Patent No.: US 6,235,230 B1
(45) Date of Patent: May 22, 2001

(54) RING GATE FOR RETRACTABLE PIN INJECTION MOLDING

(75) Inventor: Paul A. Puniello, Bristol, RI (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 09/283,966

(22) Filed: Apr. 2, 1999

(51) Int. Cl.[7] ............................. B29C 45/14; B29C 45/27
(52) U.S. Cl. ................ 264/278; 264/279.1; 264/328.12; 425/116; 425/125; 425/129.1; 425/577
(58) Field of Search ................................. 264/278, 279.1, 264/328.12; 425/116, 120, 125, 129.1, 573, 577

(56) References Cited

U.S. PATENT DOCUMENTS

| | | | |
|---|---|---|---|
| 3,559,249 | 2/1971 | Patton, Jr. | 425/567 |
| 4,959,000 | 9/1990 | Giza | 425/116 |
| 5,122,046 | 6/1992 | Lavallee | 425/116 |
| 5,554,337 | 9/1996 | Ihara | 264/442 |
| 5,827,548 | 10/1998 | Lavallee | 425/116 |

FOREIGN PATENT DOCUMENTS

| 1313748 | * 4/1973 | (GB) | 264/278 |
|---|---|---|---|

| 58-158232 | 9/1983 | (JP) . |
|---|---|---|

OTHER PUBLICATIONS

Solving Mold Filling Imbalances in Multi–Cavity Injection Molds; Beaumont et al.; Journal of Injection Molding Technology, Jun. 1998, vol. 2, No. 2, pp. 47–58.

Gating Systems, Plastics Mold Engineering Handbook, Third Edition, 1983, pp. 399–403.

Types of Sprues and Gates, Mold–Making Handbook for the Plastics Engineering, 1978, pp. 35–37.

* cited by examiner

*Primary Examiner*—Robert Davis
(74) *Attorney, Agent, or Firm*—Pennie & Edmonds LLP (57) ABSTRACT

The present invention is directed to the formation of a golf ball layer by injection molding the layer material into the mold cavity through a ring gate. After the golf ball core is securely positioned within an injection mold, layer material from at least one primary runner is introduced into a secondary runner that extends substantially around the mold cavity. The secondary runner fills with layer material until pressure within the secondary runner causes the layer material to be injected into the mold cavity through the ring gate. Injection of layer material continues until the mold cavity is completely filled. The layer material then cools and the ball is removed from the mold. The runner system providing layer material to the mold cavity may utilize a melt flipper to balance the temperature, flow and material properties of

23 Claims, 10 Drawing Sheets

*PRIOR ART*

FIG. 9B

*PRIOR ART*

RING GATE FOR RETRACTABLE PIN INJECTION MOLDING

FIELD OF INVENTION

The present invention is directed to a retractable pin injection mold for forming a cover over a golf ball, and more particularly to the application of a ring gate thereto.

BACKGROUND OF THE INVENTION

Conventionally, golf ball covers are made either by compression molding two preformed hemispherical cups about a core or by injection molding thermoplastic cover material about a core. It is standard practice in conventional injection molding to provide a mold having two cavities, each having hemispherical surfaces that mate when the mold is joined. At the initial stage of the covering process, the core of the golf ball is supported centrally within the mold by retractable pins or the like so as to leave a space for molding a cover about the core. A thermoplastic cover material then is injected into the mold cavity in a horizontal plane from a primary supply through a plurality of edge gates that usually are evenly distributed near or around the parting line of the mold halves and the equator of the inner hemispherical surface of the golf ball. The retractable pins hold the core in place while the thermoplastic cover material fills the void between the core and the inside wall of the mold. Flow of thermoplastic cover material from each of the plurality of gates eventually joins to fill the void between the golf ball core and the mold. Once the void is nearly filled, but before the thermoplastic cover material has completely hardened, the centering pins holding the core in place retract so that the thermoplastic cover material may fill the voids left by the pins. The thermoplastic cover material then cools and hardens to form the cover.

For the last two decades, thermoplastic resin blends have been used extensively in injection molding processes as cover materials for golf balls. Over the years, such resin blends have been used to form very durable golf ball covers while also providing acceptable in-play characteristics such as spin rate, feel and initial velocity. Additional components conventionally added to cover compositions include ultraviolet light stabilizers and/or absorbers, optical brighteners, fluorescent pigments, dyes, processing aids and fillers. While modern day thermoplastic resin blend cover materials described above are satisfactory and in fact are more durable than previous cover materials, their use in multiple edge gate injection molding may result in increased occurrences in "flow front failure" along the knit lines of the cover.

Golf ball covers typically exhibit one of two types of failures: (1) "random failures"; or (2) "flow front failures." "Random failures" are flaws such as cuts, cracks or other fractures that appear anywhere on the outer surface of the cover of a golf ball after it has been struck with a club. Random failures may appear anywhere in the cover and either are the result of a random defect in the cover or occur due to mishitting the ball. "Flow front failures" are defects such as cracks, fractures or other surface defects which appear along knit line areas of the cover. Knit lines are seams along the cover that are formed where thermoplastic cover material intermixes from different sources during the formation of the golf ball cover. For example, when a golf ball cover is formed by compression molding, a knit line forms at the mold parting line along the equator of the ball where the thermoplastic resin material of the hemispherical cups flows together. The parting line flash is subsequently removed by cutting the excess material and/or buffing the ball. The "flow front" of such compression molded golf ball covers corresponds to the location of the parting line.

Similarly, when a golf ball cover is formed using a conventional retractable pin injection molding process with multiple edge gates to inject a thermoplastic resin blend into a mold, the thermoplastic resin blend from each gate has a flow front that eventually abuts cover material entering the mold from other gates. As such, there are a number of knit lines or flow fronts throughout a cover where cover material from various gates flows together as it fills the void between the golf ball core and the mold. Depending on the composition of the thermoplastic resin blend, the cover material tensile strength can be reduced by as much as 10% to 60% along the knit lines.

Because the cover is inherently weaker along the knit lines, the knit lines are more susceptible to flow front failures. As mentioned above, it is generally recognized in the golf ball industry that the occurrence of flow front failures is not the result of random flaws or imperfections along the seam of the ball or from mishitting the ball, but rather are a result of an incompatibility and/or incomplete mixing of the various components of the cover material and cooling that takes place at the flow front before the thermoplastic resin blend intermixes with cover material from different sources, i.e., from different gates. Thus, the use of a plurality of gates in an injection molding process generally results in the presence of knit lines.

Therefore, there exists a need for a method of making golf ball covers by an injecting molding process which does not result in the occurrence of knit lines, thereby increasing the durability of the golf ball cover and extending the useful life of the golf ball.

In addition to resulting in knit lines that may weaken the golf ball cover, conventional multiple edge gate injection molding also may not maintain balanced flow or uniform filling of thermoplastic resin blend cover material between the core and the inside wall of the mold, which may further weaken the golf ball cover. For example, non-uniform filling can cause the flow terminus of the cover material to not meet at the poles of the ball where trapped air and gasses typically are released through a vent. When the flow terminus is not at the poles of the mold, the trapped air and gasses cannot evacuate the cavity effectively, thereby further compromising knit line integrity and reducing the durability of the cover.

Actions taken to overcome unbalanced flow of cover material injected into a golf ball mold through a plurality of gates also may weaken the golf ball cover. There are two known causes of unbalanced flow in conventional multiple edge gate injection molding. First, the supply of cover material to each gate may not be identical to other gates in the mold, thereby causing unbalanced flow and pressure upon the core during the injection molding process. One remedy for this potential problem is for the flow length in the runners feeding each gate to be equal and for each gate to be dimensionally identical. Any dimensional discrepancies in these gates may cause unbalanced filling. Because dimensional discrepancies play such an important role in achieving balanced flow, conventional multiple edge gate injection molds may utilize an even number of gates, i.e., 4, 6, 8 or even 10 gates, in a two-prong secondary runner system where the dimensions of the prongs are virtually mirror images of each other. Furthermore, it is desirable to distribute the plurality of gates symmetrically about the mold in order to maintain balanced pressure and flow about the core. Dimple patterns of the ball, however, may require that the gates not be symmetrically spaced about the equator of the ball, which results in unbalanced, nonuniform filling of the mold.

Another way to address unbalanced fill caused by the location and geometry of the gates is to keep the retractable pins engaged with the core until the mold is nearly completely filled with cover material. In order to maintain reasonable concentricity between the cover and the core, however, a significant percentage of the core must be covered with material before the pins can be retracted. Thus, the cover material may fill the mold and surround at least one of the engaged pins centering the core within the mold. While the cover material is solidifying, yet still moldable, the pins can be retracted and the remaining holes are filled in.

Keeping the retractable pins engaged with the core while the cover material surrounds the pins, however, can lead to a second cause of unbalanced, nonuniform fill. Such contact with the retractable pins causes the cover material to immediately cool, which in turn slows the progression of cover material and causes the flow terminus to not meet at the poles of the ball. This results in poor venting and weakened knit lines.

Moreover, the number and arrangement of retractable pins primarily depends upon the dimple size and pattern of the golf ball because the faces of the retractable pins usually are shaped to form a dimple of the golf ball cover. Conventional dimple patterns are Icosahedron in shape, thereby dictating that there be five retractable pins at both poles of the mold to position the golf ball core during the injection process. As a result, the number and location of retractable pins for conventional multiple edge gate injection molding usually does not correspond to the number and location of gates. This disparity can cause the resin blend cover material to reach each of the retractable pins at different times, which in turn causes the flow terminus for the cover material to be located away from the poles of the mold where air and other gasses are vented.

Thus, while it is possible to counteract unbalanced, nonuniform flow that unavoidably results from use of conventional multiple edge gate injection molding, it is preferable to eliminate or reduce unbalanced, nonuniform flow.

Figure 1:
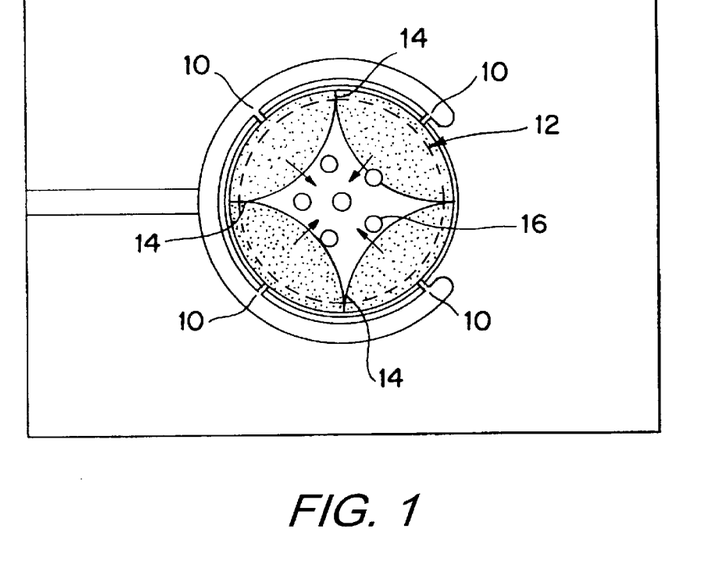
FIG. 1 illustrates a top plan view of one section of a two-section golf ball injection mold having conventional multiple edge gates wherein cover material injected into the mold through the multiple edge gates partially covers the core.
Figure 2:
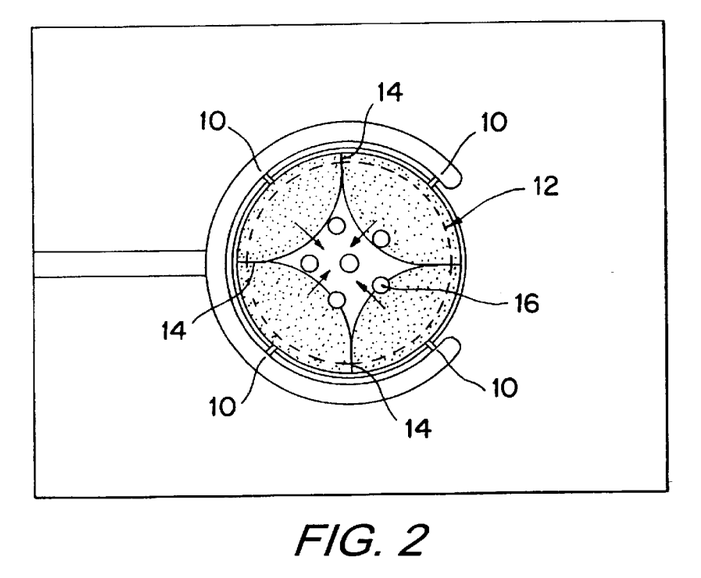
FIG. 2 illustrates a top plan view of a golf ball injection mold having conventional multiple edge gates, wherein cover material injected into the mold through the multiple edge gates substantially covers the core and has filled one of the retractable pins, which are engaged with the core of the ball.

FIGS. 1 and 2 illustrate the problems encountered and described above when utilizing multiple edge gates 10 for a golf ball mold. It is evident that cover material entering a mold through a plurality of gates causes discontinuous point source forces on the core of the golf ball that can result in unbalanced, nonuniform filling of the mold. These discontinuous point source forces must be carefully balanced in order to ensure that the core 12 of the golf ball maintains its centered position during the covering process.

FIG. 1 illustrates the formation of knit lines 14 as flow from any one gate 10 abuts with flow from a neighboring gate 10. As the mold is filled, knit lines 14 are formed between each gate 10 where the cover material abuts with an opposing flow source. The multiple knit lines of the cover ultimately intersect at the flow terminus of the cover material. While it is desirable that the flow terminus be located where trapped air and gasses are vented, i.e. at the poles of the mold cavity, it is difficult to control the location of the flow terminus with conventional multiple edge gate injection molding. Moreover, cover material injected into a golf ball mold through a plurality of gates can cause the mold cavity to fill unevenly. This uneven filling of the mold leads to cover material reaching each of the retractable pins 16 at different times, as shown in FIG. 2, which in turn further disrupts the filling of the mold.

SUMMARY OF THE INVENTION

The present invention is directed to the formation of a layer or cover over a golf ball core by an injection molding process. In particular, the injection mold utilizes a ring gate to substantially reduce if not eliminate the occurrence of knit lines, thereby minimizing the occurrence of flow front failures and increasing the useful life of the golf ball. The present invention also aids in centering the core of the ball during the injection molding process, because the pressure exerted on the golf ball core from flow of cover material entering the mold is substantially equalized around the core. In addition to providing greater balanced flow, use of a ring gate will allow the cover material to fill the mold more uniformly so that the golf ball core is covered more completely before the cover material reaches the retractable pins. Further, a ring gate will provide greater balanced flow and more uniform filling of the mold than can be achieved from conventional, multiple edge gate injection molds for golf ball covers. In the preferred process, the retractable pins or other devices that hold the core in place during the injection process are retracted or disengaged from the core before the cover material reaches them. An additional benefit of using a ring gate to form a golf ball cover is that, as a result of equalized pressure flow, a uniform flow front and retraction of the pins before the cover material contacts the pins, the flow terminus will be located at the poles of the mold where trapped air can be vented. Thus, cycle times and golf ball durability can be improved.

During the initial stage of the injection molding process utilizing a ring gate, the injected material first fills a secondary runner that is a ring-shaped reservoir, with the ring gate acting as a brake until the secondary runner is substantially, and preferably completely, filled. Once the secondary runner is filled, the pressure increases equally throughout the secondary runner and the injection material flows evenly through the ring gate opening. In the preferred embodiment, the ring gate is one or more portions of a ring that surrounds a substantial portion of the golf ball core's equator. Most preferably, the ring gate is a single ring that surrounds the entire golf ball equator.

By the present invention, it is believed that the problems associated with flow fronts and knit lines that result from using a plurality of gates for a golf ball injection mold can be avoided or prevented by employing a ring gate. Specifically, covers are formed in the present invention by injecting an polymeric material through a ring gate that extends approximately around the core of the ball, preferably disposed at or near the equator of the core of the ball. Use of a ring gate also will increase the durability of the ball cover by providing greater balanced, uniform flow and minimizing the occurrence of knit lines.

Finally, while use of ring gates have been known to provide uniform filling of mold cavities and avoidance of knit lines, previous uses of ring gates have been used to form cylindrical shapes but not for applying a layer over a spherical object such as a golf ball core. Furthermore, use of multiple edge gates in the manufacture of golf balls were preferred over alternative injection methods because use of multiple edge gates were believed to result in low degating costs and less waste of material, and the manufacturing and durability advantages gained from using a ring gate to form a golf ball cover were not previously realized. Thus, for a number of reasons, it was not previously appreciated that a ring gate for injection molding golf ball covers would improve the injection molding process cycle time and also would improve the durability of the cover by eliminating undesirable knit lines.

One embodiment of the invention includes a two mold plates having substantially hemispherical inner surfaces that form a substantially spherically shaped mold cavity when the two plates are joined. The two mold plates also form an annular opening around a substantial portion of the spherically shaped mold cavity near the parting line of the two mold plates. In another embodiment of the invention, the mold plates further define a ring-shaped secondary runner, the centerline of which is located about 0.075 inches to about 0.185 inches from the spherically shaped cavity. In another embodiment, the centerline of the secondary runner is located about 0.145 inches from the spherically shaped mold cavity. In yet another embodiment, the secondary runner is located approximately at the equator of the spherical mold cavity.

In one embodiment, the ring gate opening into the spherically shaped mold cavity has a height between about 0.005 inches to 0.04 inches. In another embodiment, the land of the ring gate is from about 0.01 inches to about 0.1 inches. In yet another embodiment, the land of the ring gate is from about 0.05 inches to about 0.07 inches.

In one embodiment, the ring gate is located near the equator of the spherically shaped mold cavity. In another embodiment, the runner system around the spherically shaped mold cavity includes a hot runner system.

The invention also relates to a method of forming a golf ball cover by injection molding cover material through a ring gate. In one embodiment, the method includes the steps of securely positioning a golf ball core into an injection mold having a substantially spherically shaped mold cavity, supplying cover material to a secondary runner located substantially around the mold cavity, substantially filling the secondary runner until pressure within the secondary runner causes the cover material to be injected into and fill the mold cavity through one or more gates that extend substantially around a circumference of the mold cavity. After the mold cavity has been substantially filled, the injected material is allowed to harden and the ball is removed from the mold.

In another embodiment, the golf ball core is secured in place by retractable pins disposed near the poles of the mold cavity. Another embodiment includes the step of disengaging the retractable pins before the injected material comes into contact with them. In yet another embodiment, the injected material is supplied from a hot runner system. In another embodiment, the injected material is supplied to the mold cavity through a runner system that utilizes a melt flipper.

The invention also relates to a golf ball injection mold having a first and second mold plate that, each having substantially hemispherical inner surfaces that when joined form a substantially spherically shaped mold cavity. The mold further includes a branched runner system having at least one melt flipper and terminating at the spherically shaped mold cavity. In one embodiment, the golf ball injection mold further includes a substantially continuous annular opening around a substantial portion of the spherically shaped mold cavity. In another embodiment, the golf ball injection mold further includes a plurality of edge gates.

BRIEF DESCRIPTION OF THE DRAWINGS

The present invention will be more clearly understood by the figures provided herein.

DETAILED DESCRIPTION OF THE INVENTION

Figure 3:
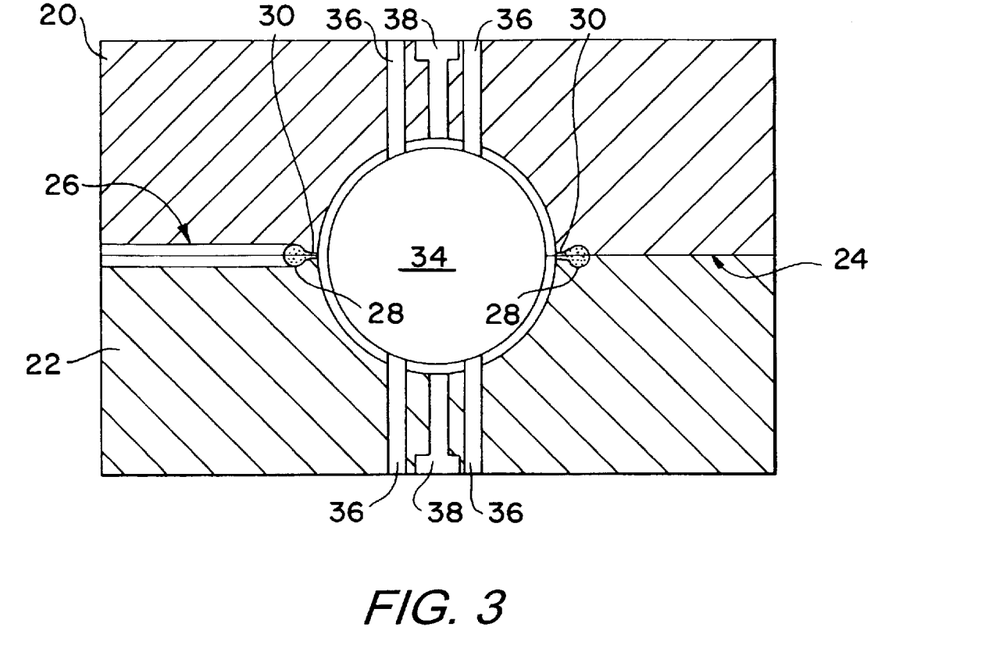
FIG. 3 is a partially cross-sectioned side view of a golf ball injection mold having a ring gate in accordance with the present invention and showing a golf ball core supported by retractable pins and cover material within the ring gate but not yet within the golf ball mold.

FIG. 3 is a side cross-sectional view of a mold of the present invention having a ring gate 30 through which material is injected into the mold cavity. The mold is comprised of a top mold plate 20 and a bottom mold plate 22 joined at a parting line 24. Mold plates 20 and 22 are relieved to form at least one primary runner 26 and secondary runner 28. In addition, the parting line 24 around the cavity is relieved from inside the cavity wall out to the secondary runner forming a ring gate 30 as a substantially continuous annular opening around the mold cavity positioned between the mold cavity and the secondary runner 28. It is preferred that the secondary runner 28 and ring gate 30 extend substantially completely around the mold and that the ring gate 30 be disposed approximately at the equator of the mold cavity.

While the secondary runner 28 may be sized and positioned to achieve desired flow characteristics, it is preferred that the secondary runner 28 be located between about 0.075 to about 0.185 inches from the mold cavity wall to the centerline of the secondary runner 28, most preferably located about 0.145 inches from the mold cavity wall to the centerline of the secondary runner 28. The cross section of the secondary runner 28 preferably is essentially circular in shape, although other shapes may be equally suitable, and dimensioned to have an area that is large enough to provide easy flow therethrough. The cross sectional area of the secondary runner 28 may be larger than that of the primary runner 26 to create a pressure drop as the injected material enters the secondary runner. This pressure drop may aid in more completely filling the secondary runner 28 before injected material enters the mold cavity.

The cross section of the secondary runner 28 may be uniform about the mold or may have varying cross sections, such as having increased or decreased diameters if the cross section of the secondary runner 28 is essentially circular, to facilitate substantial filling of the secondary runner 28 before any material begins entering the mold cavity through the ring gate 30. The ring gate 30 is disposed approximately around the mold cavity between the secondary runner 28 and the mold cavity, preferably disposed near the equator of the mold cavity.

During the injection molding process, at least one primary runner 26 directs cover material into the secondary runner 28. While FIGS. 3–7 illustrate only one primary runner 26, it is to be understood that additional primary runners may be utilized. The primary runner 26 may be integrated with a hot runner system or cold runner system, which are well known systems by those of ordinary skill in the art. In a hot runner system, a continuously heated supply of cover material from a primary runner is connected to the secondary runner system of the mold. Flow from the continuously heated primary runner then is introduced into the secondary runner system and mold cavity. Once the mold cavity is filled, flow from the hot runner is restricted and only the material in the secondary runner and mold cavity is allowed to cool while the cover material in the primary runner remains in a molten state. In contrast, material in the primary runner of a cold runner system is allowed to cool once the mold cavity is filled so that the cover material in the primary runner hardens. Use of a hot runner system reduces the amount of scrap material that cools in the runner system and reduces cooling of the material as it travels through the runner system of the mold.

In addition, particularly where a plurality of mold cavities are formed in a mold, the runner system for the mold may utilize "melt flippers," which are described in John P. Beaumont, Jack H. Young, and Matthew J. Jaworski, *Solving Mold Filling Imbalances in Multi-Cavitiy Injection Molds*, J. of Injection Molding Tech., June 1998, vol. 2, in order to better maintain uniform flow characteristics and thermal balances of cover material introduced into the secondary runners for each mold cavity. Use of a "melt flipper" in a runner system supplying material to a plurality of cavities creates a balance of thermal, flow and material properties to all cavities in the mold, particularly where the runner system has more than two branches. Imbalances in temperature, flow and material properties can result from non-symmetrical shear distribution within the melt as it travels through the runner system. To remedy these imbalances, a "melt flipper" rearranges the shear induced variation of the injected material so that the properties of the material entering each cavity are essentially the same. A melt flipper rearranges the shear induced variations in the runner by introducing the injected material into a branch of a runner system at an angle that is approximately perpendicular to the plane in which the branches of the runner system are located in the mold.

Figure 9A:
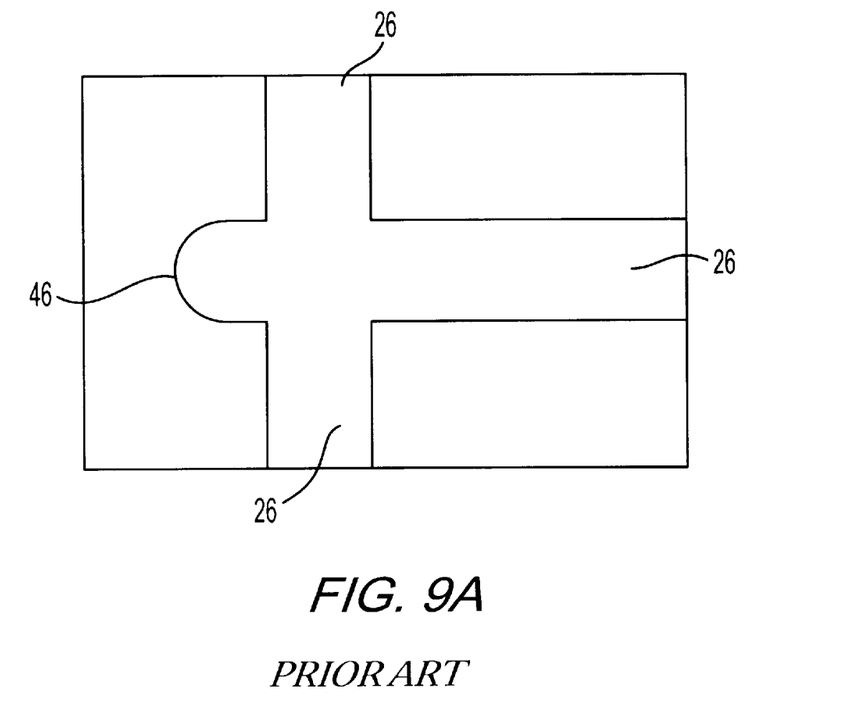
FIG. 9A is a top plan view of one section of a conventional branching runner system for a golf ball injection mold.
Figure 9B:
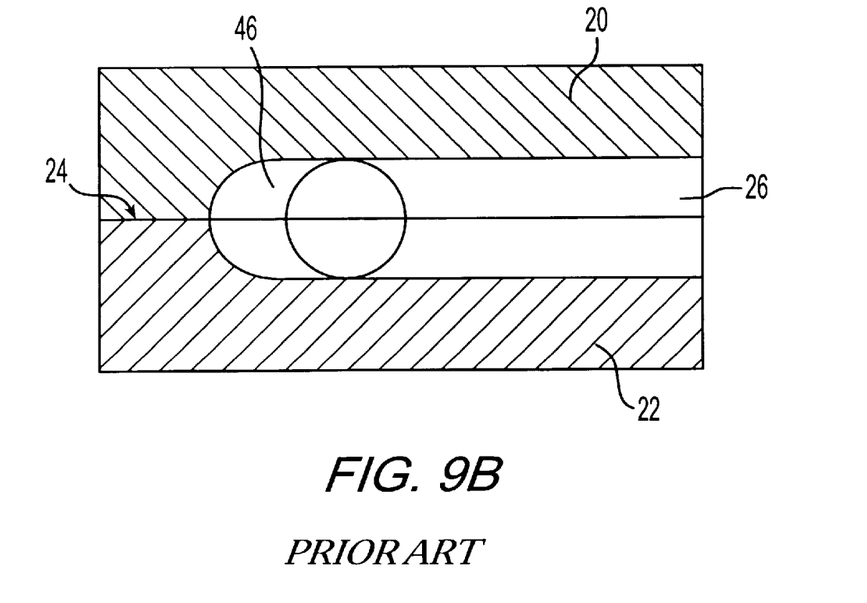
FIG. 9B is a cross-sectioned side view of one section of a conventional branching runner system for a golf ball injection mold.
Figure 10A:
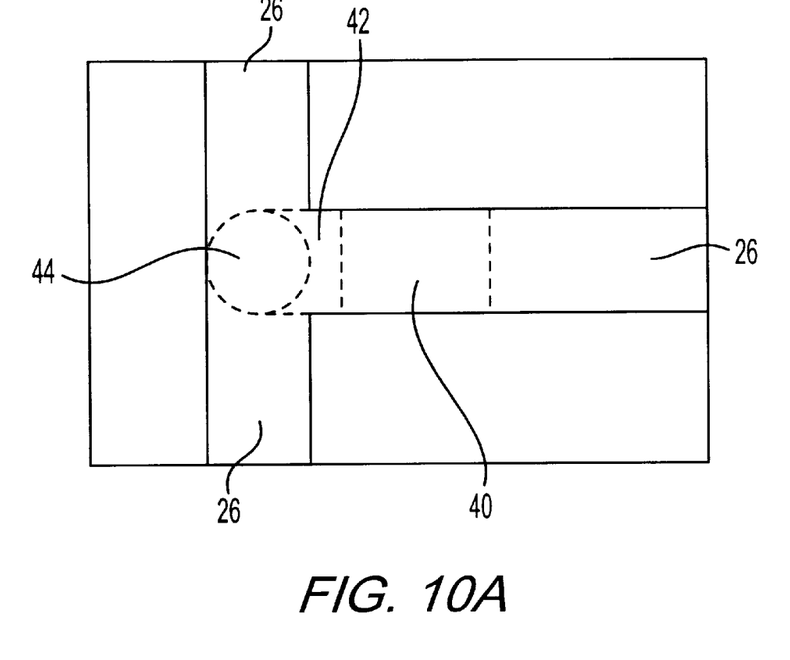
FIG. 10A is a top plan view of one section of a branching runner system utilizing a melt flipper for a golf ball injection mold.
Figure 10B:
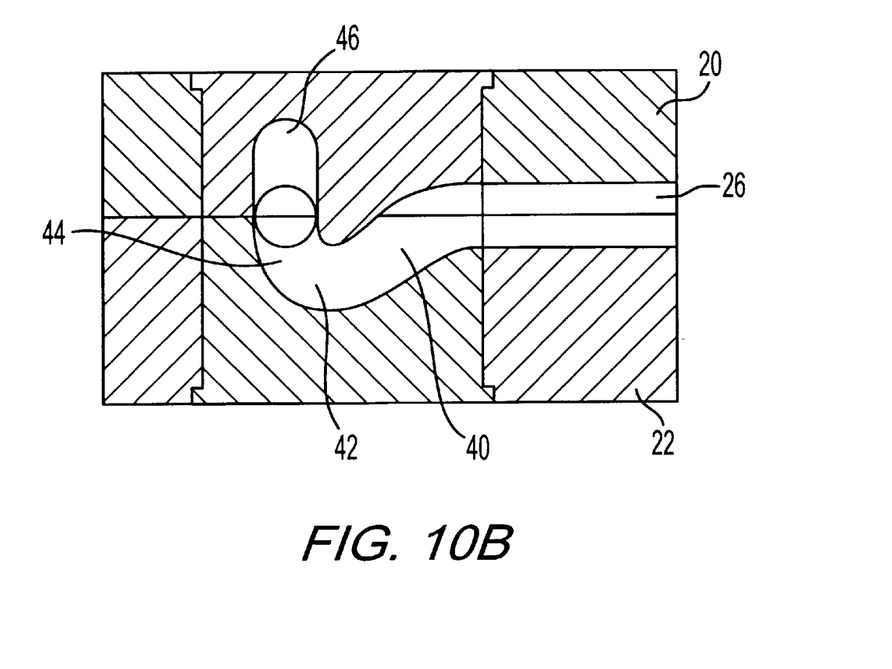
FIG. 10B is a cross-sectioned side view of one section of a branching runner system utilizing a melt flipper for a golf ball injection mold.

In one embodiment, for example, one or more branches of a conventional runner system that directs the flow of injected material through a series of runners and branches located essentially within a horizontal plane near the parting line of the mold (FIGS. 9A–B) utilizes a melt flipper (FIGS. 10A–B and FIGS. 12A–D) made of a section of runner 40 that departs from the horizontal plane in which most of the runner system travels and a section of runner 42 that redirects the flow of cover material toward the horizontal plane at an angle approximately perpendicular to the horizontal plane. The section of runner redirecting flow of cover material toward the horizontal plane may be v-shaped or u-shaped, although one of ordinary skill in the art would appreciate that other shapes or configurations may be used. In one embodiment (FIGS. 10A–B), the melt flipper also includes a vertical section of runner 44 that forms a T-intersection with the branches of the runner system. If desired, a cold slug well 46 may be provided at the T-intersection.

Figure 11:
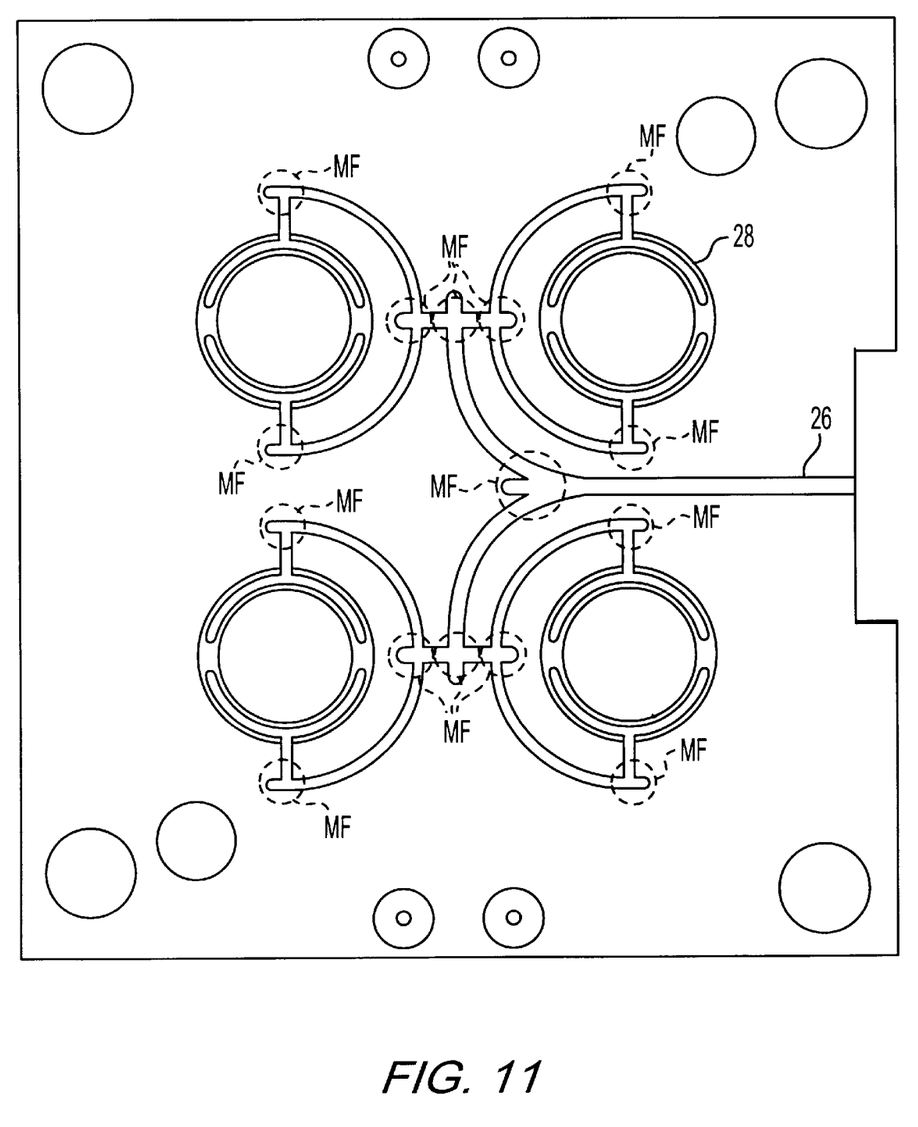
FIG. 11 is a top view of a mold plate for a golf ball injection mold identifying runner junctions where a melt flipper may be utilized.
Figure 12A:
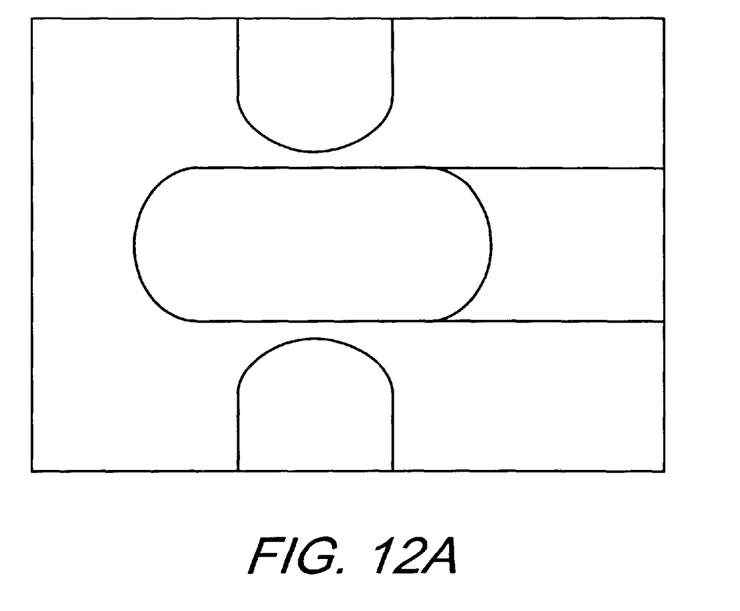
FIG. 12A is a top plan view of the parting line surface of a bottom plate of a branching runner system utilizing a melt flipper for a golf ball injection mold.
Figure 12B:
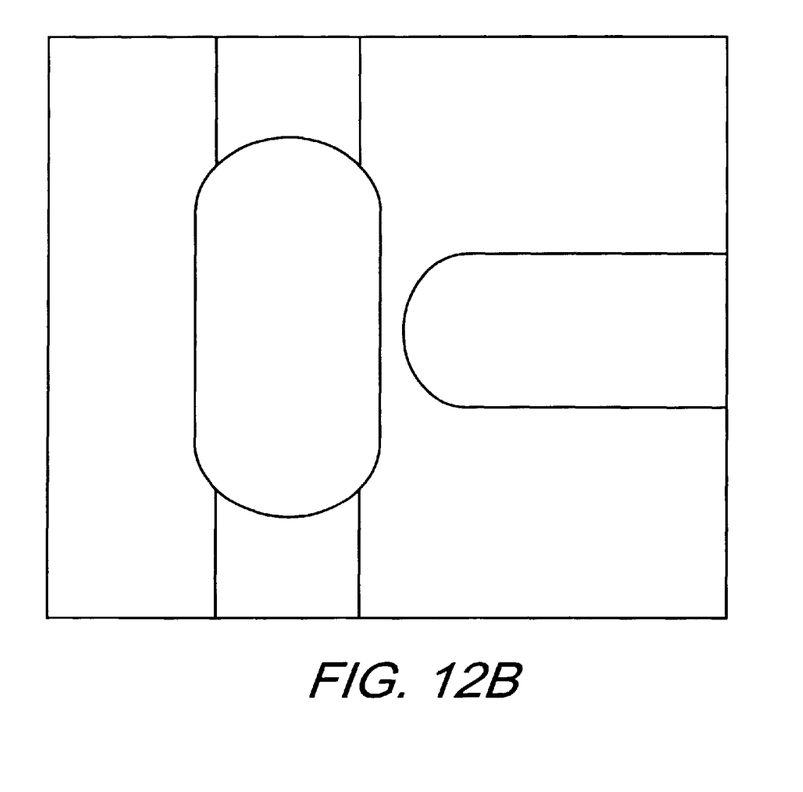
FIG. 12B is a top plan view of the parting line surface of a top plate of a branching runner system utilizing a melt flipper for a golf ball injection mold.
Figure 12C:
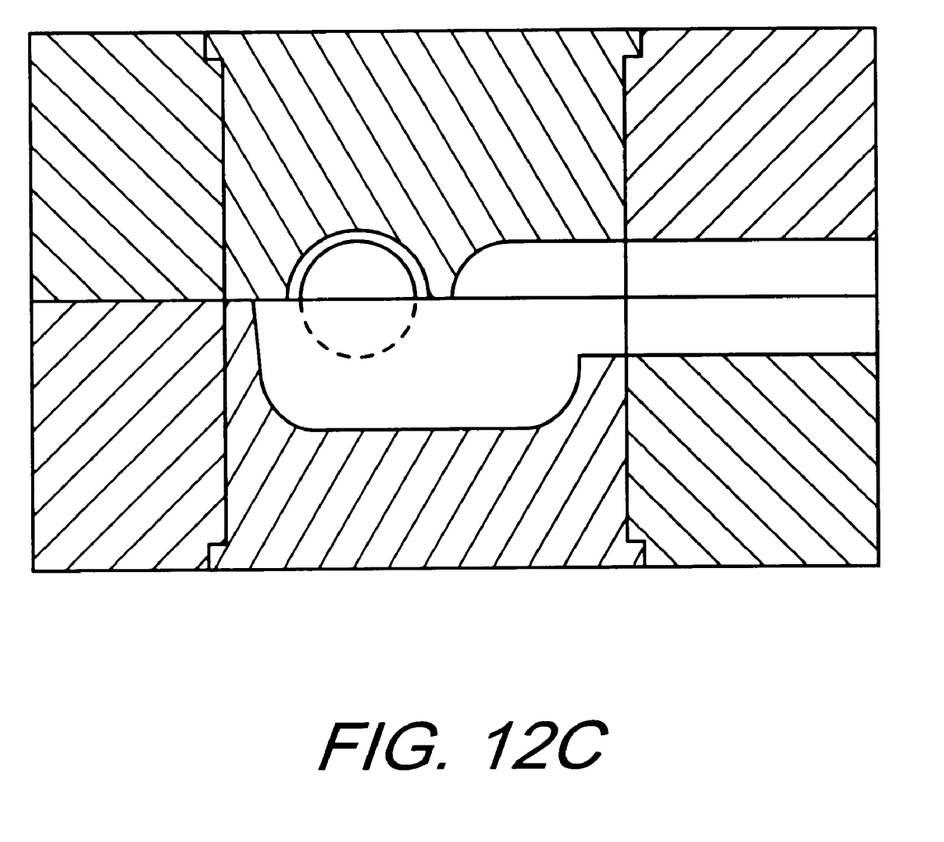
FIG. 12C is a cross-sectioned side view of one section of a branching runner system utilizing a melt flipper for a golf ball injection mold.
Figure 12D:
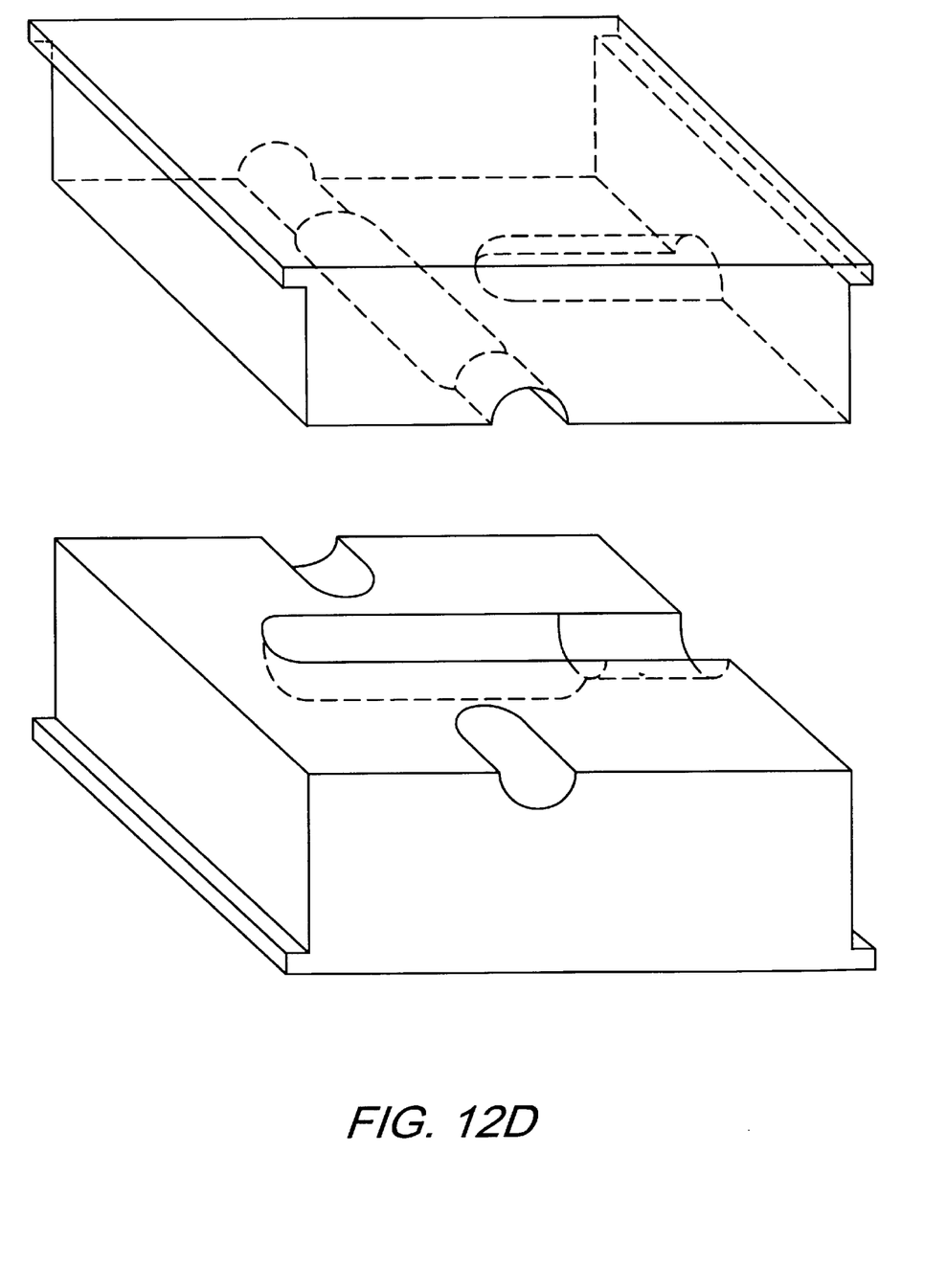
FIG. 12D is an exploded view of one section of a branching runner system utilizing a melt flipper for a golf ball injection mold.

As will be appreciated by one of ordinary skill in the art, a melt flipper may be oriented such that the section of runner 40 departing from the horizontal plane may travel upwards or downwards from the horizontal plane. Thus, the orientation of the melt flipper as shown in FIGS. 10A–B and 12A–D is not critical to the invention. In addition, one of ordinary skill would appreciate that additional melt flippers may be used at various runner junctions of a golf ball mold to achieve desired flow characteristics into the mold cavities. Examples of runner junction locations where a melt flipper may be used in a golf ball mold are identified with the letters "MF" in FIG. 11.

Cover material provided from the primary runner 26 first substantially fills the secondary runner 28 before entering the mold through the ring gate 30. As stated previously, more than one primary runner 26 may be used to fill the secondary runner. In a second embodiment, two primary runners 26 are disposed at opposite ends of the secondary runner 28. Because the injected material takes the path of least resistance, the material flows from the primary runner 26 to substantially fill the secondary runner 28 before the pressure is increased enough to force the cover material through the ring gate 30. The pressure required to fill the secondary runner 28 is lower than to flow through the ring gate 30. Once the secondary runner 28 is substantially filled, however, the pressure increases equally therein until cover material is forced through the ring gate 30 to simultaneously fill the mold cavity. Because the cover material is injected into the mold through a substantially continuous opening around the mold cavity 30, pressure forces exerted on the ball core 34 will be equalized, thereby reducing the need for counteracting any unbalanced forces by engaging retractable pins 36 against the golf ball core 34 even after the cover material has come into contact with them.

Figure 4:
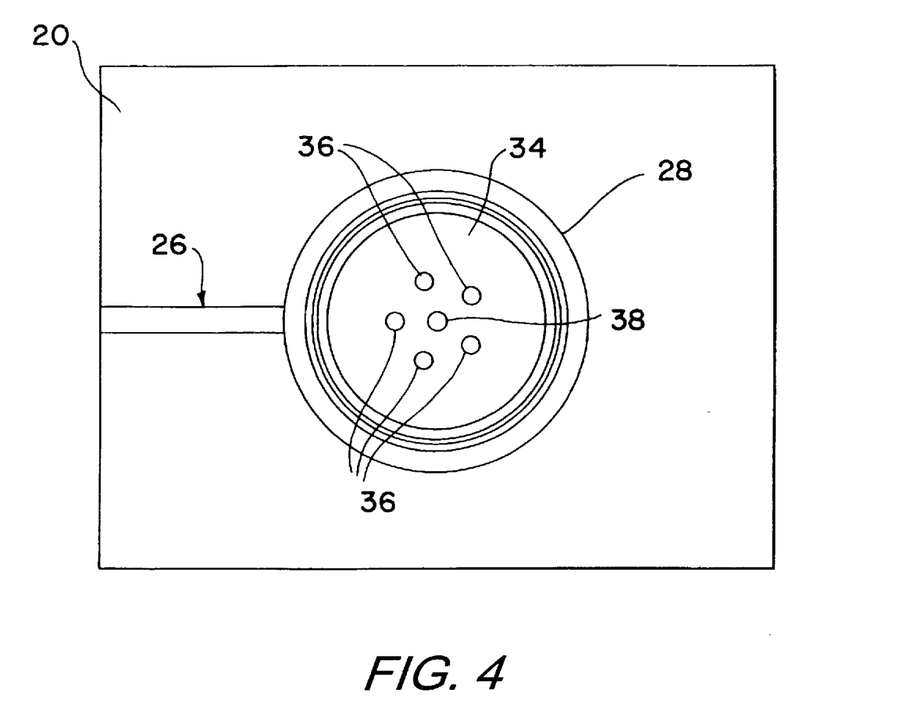
FIG. 4 is a top plan view of one section of a two-section golf ball injection mold having a ring gate in accordance with the present invention.

As illustrated in FIGS. 3 and 4, a plurality of retractable pins 36 and a vent pin 38 are disposed near the upper and lower poles of the mold. The retractable pins 36 are engaged to securely position the golf ball core 34 during the initial stage of the injection process. To ensure balanced, uniform filling, it is preferred that the retractable pins 36 remain engaged with the golf ball core 34 until the core 34 is substantially surrounded by cover material. It is further preferred, however, that the retractable pins 36 are disengaged from the core 34 before the cover material comes into contact with the retractable pins 36. As long as the retractable pins 36 are disposed a uniform distance from the poles of the mold cavity, keeping the pins 36 engaged with the golf ball core 34 even after the cover material comes into contact with them would not adversely affect the location of the cover material flow terminus because the cover material will reach all of the retractable pins 36 engaged with the golf ball core 34 at approximately the same time.

When disengaged from the golf ball core 34, the retractable pins 36 retract until the faces of the pins are flush with the inside wall of the mold cavity. The faces of the retractable pins 36 may be shaped to form dimples on the ball cover. The number and arrangement of retractable pins 36 may vary according to dimple size and pattern, although the mold in FIG. 4 illustrates five retractable pins 36 for dimple patterns that are Icosahedron in shape as an example.

The vent pins 38 shown disposed near the poles of the mold permit excess air and other gasses to escape as cover material is injected into the mold. It is preferred that the vent pins 38 are located at the cover material flow terminus so that no air or other gasses will remain trapped in the mold. As the flow of cover material injected into a golf ball mold through a ring gate 30 will be balanced and uniform, it is expected that the flow terminus will be located at or near the poles of the golf ball.

Figure 5:
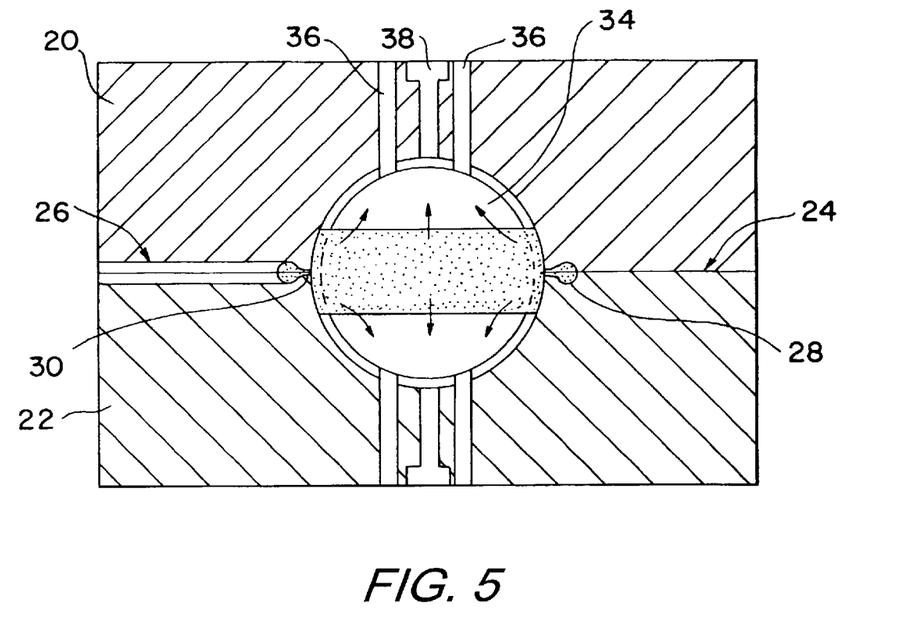
FIG. 5 is a partially cross-sectioned side view of a golf ball injection mold having a ring gate in accordance with the present invention, wherein retractable pins are engaged with the core of the ball and cover material injected into the golf ball mold through the ring gate partially covers the core.

As may be seen with reference to FIG. 5, once the pressure increases sufficiently to cause the cover material to be forced through the ring gate 30 to simultaneously fill the mold cavity, the cover material will fill the mold cavity uniformly without respect to longitudinal position. In addition, the occurrence of knit lines, if any, will be substantially reduced because the cover material enters the cavity from all points of the ring gate as a single, uniform flow front with a flow terminus at the poles of the ball.

Figure 6:
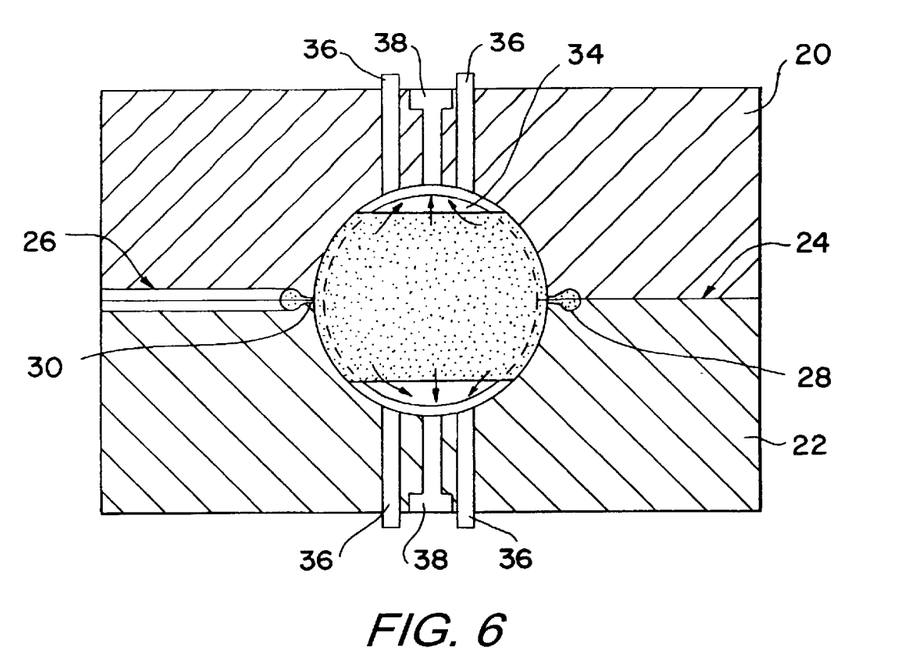
FIG. 6 illustrates a partially cross-sectioned side view of a golf ball injection mold having a ring gate in accordance with the present invention, wherein retractable pins are disengaged from the core of the ball and cover material injected into the mold through the ring gate substantially covers the core.
Figure 7:
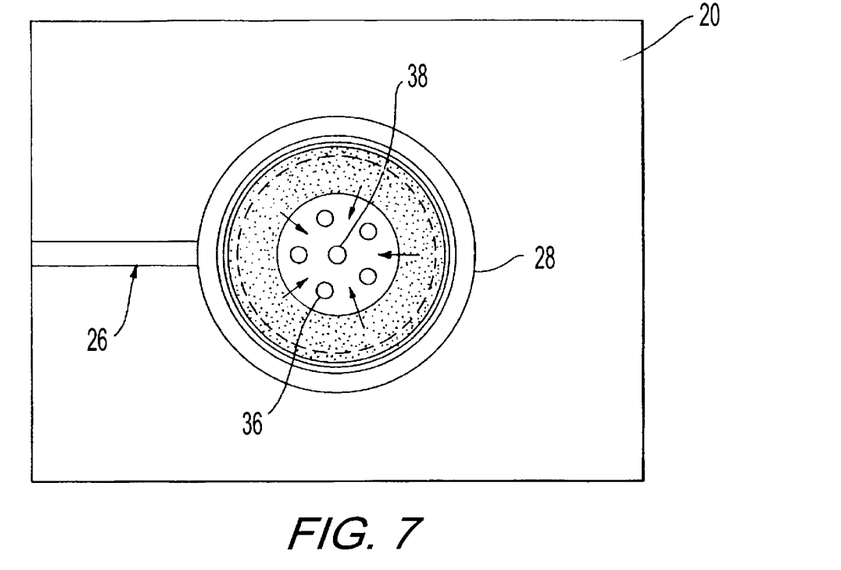
FIG. 7 illustrates a top plan view of a golf ball injection mold having a ring gate in accordance with the present invention and at a similar state of the injection molding process as that shown in FIG. 4, wherein retractable pins are disengaged from the core of the ball and cover material injected into the mold through the ring gate substantially covers the core.
Figure 8A:
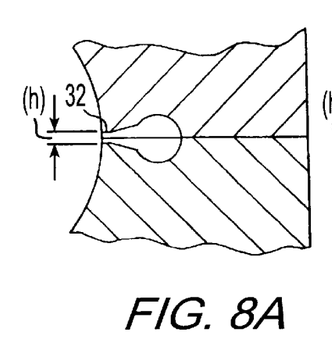
FIGS. 8A–F are cross-sectioned profile views of ring gates in accordance with the present invention.
Figure 8B:
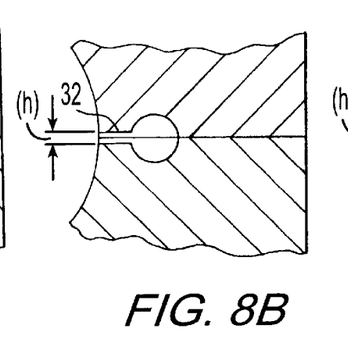
Figure 8C:
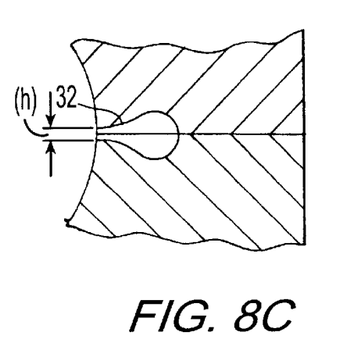
Figure 8D:
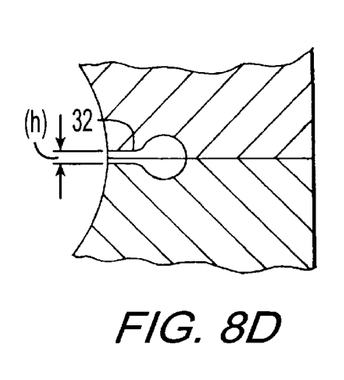
Figure 8E:
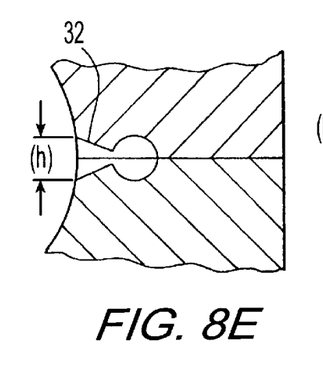
Figure 8F:
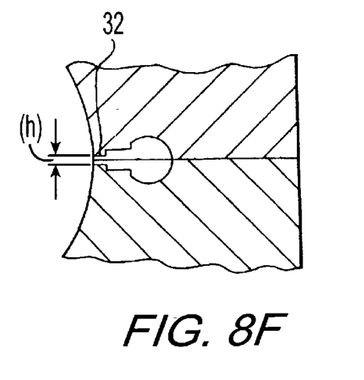

FIGS. 6 and 7 demonstrate that as the mold becomes nearly filled, the cover material will approach the retractable pins 36 at approximately the same time. In addition to the balanced flow and pressure that results from use of a ring gate instead of conventional multiple edge gate injection molding, a greater proportion of the mold cavity will be filled by the time the cover material reaches the retractable pins than would be filled by a multiple edge gate injection molding process. As a result, the golf ball core 34 will be securely held in its desired position before the cover material reaches the retractable pins 36. Because the core 34 is securely positioned and flow entering the mold is balanced, it is preferred that the retractable pins 36 be disengaged before the core 34 before the cover material comes into contact with them, as illustrated in FIG. 6. Disengaging the retractable pins 36 before the cover material reaches them will further ensure that the mold fills evenly and uniformly with cover material and that the flow terminus of the cover material is located at the vent pins 38 so that air and other gasses may be vented.

As illustrated in FIGS. 8A–8F, the profile of the ring gate 30 may be shaped to optimize flow into the mold. While no particular profile is preferred, the profile of the ring gate 30 may be comprised of multiple angled or curved surfaces that are configured and adapted to achieve desirable flow characteristics. The land 32 of the ring gate, for example, may become more restricting, expand or maintain a constant height as the cover material passes from the secondary runner 28 into the mold cavity. A mold filling analysis, simulation or other study of the performance of the ring gate 30 may be utilized to identify the optimum for particular cover materials or operating conditions. Factors that may affect the flow characteristics of a particular mold include, among others, operating pressure and temperature, secondary runner and ring gate geometry, and the type of cover material utilized. While no particular profile is preferred, it is preferred that the ring gate 30 be between about 0.005 inches and about 0.04 inches in height (h) at the opening to the mold cavity, most preferably about 0.01 inches in height, and that the land 32 (l) for the ring gate 30 be between about 0.01 inches to about 0.1 inches in length, preferably between about 0.05 to about 0.07 inches long, most preferably about 0.06 inches long.

The method of operating a golf ball injection mold that uses a ring gate instead of a plurality of gates is similar to that of operating a conventional multiple edge gate golf ball mold. The golf ball core 34 is placed within the mold and the retractable pins 36 engage with the core 34 to position it within the mold cavity. Cover material is supplied from a primary runner 26 to an annular secondary runner 28 positioned around the mold cavity. Once the secondary runner 28 fills with cover material, the pressure differential across the ring gate 30 increases and ultimately causes the cover material to flow evenly into the mold cavity, thereby forming a uniform cover with minimal knit lines. The retractable pins 36 may be disengaged from the golf ball core 34 once the core is securely held in position by cover material. It is preferred that the retractable pins 36 are disengaged before the cover material comes into contact with them. Injection of cover material continues until the mold is completely filled, and then the cover material is allowed to cool and harden. Once the cover material has sufficiently cooled, the mold is opened and the golf ball is removed for further processing.

It is to be understood that the above description and drawings are illustrative, only, since variations in the disclosed mold could be made without departing from the invention, the scope of which is to be limited only by the following claims.

I claim:

1. An injection mold for producing golf balls, comprising:

A first mold plate defining a first cavity having a substantially hemispherical inner surface terminating in a first parting line surface;

A second mold plate defining a second cavity having a substantially hemispherical inner surface terminating in a second parting line surface, wherein the cavities of said mold plates form a substantially spherically shaped mold cavity and said parting lines form a ring gate that is a substantially continuous annular opening around a substantial portion of the mold cavity;

A primary runner for supplying layer material to the mold;

A ring-shaped secondary runner disposed around the mold cavity in communication with the primary runner and the ring gate, wherein the primary runner and secondary runner are configured and adapted within the mold such that flow of layer material from the primary runner is introduced into the secondary runner in a direction essentially perpendicular to the first and second parting line surfaces.

2. The injection mold of claim 1 wherein the ring-shaped secondary runner has a centerline therethrough that is disposed substantially around the mold cavity about 0.075 to about 0.185 inches from the spherically shaped mold cavity.

3. The injection mold of claim 2 wherein said centerline of the secondary runner is disposed approximately 0.145 inches from spherically shaped mold cavity.

4. The injection mold of claim 3 wherein said secondary runner is disposed approximately at the equator of the mold cavity.

5. The injection mold of claim 1 wherein the ring gate has a height between about 0.005 to about 0.04 inches.

6. The injection mold of claim 1 wherein the ring gate has a land between about 0.01 to about 0.10 inches.

7. The injection mold of claim 6 wherein the land is between about 0.05 to about 0.07 inches.

8. The injection mold of claim 1 wherein the ring gate is disposed approximately at the equator of the spherically shaped mold cavity.

9. The injection mold of claim 2 further comprising a hot runner system connected to the secondary runner.

10. A method of forming a golf ball cover by injection molding cover material through a ring gate, comprising the following steps:
   securely positioning a golf ball core into an injection mold having a substantially spherically shaped mold cavity;
   supplying cover material form at least one primary runner to a secondary runner disposed substantially in a plane around the mold cavity such that the flow of material from the primary runner is introduced into the secondary runner in a direction essentially perpendicular to said plane;
   substantially filling the secondary runner until pressure within the secondary runner causes the cover material to be injected into the mold cavity;
   filling said mold cavity with cover material through one or more gates that extend around substantially a circumference of the mold cavity until the mold cavity is completely filled;
   allowing the cover material to harden; and
   removing the ball from the mold.

11. A method of forming a golf ball cover according to claim 10 wherein the golf ball core is securely positioned by retractable pins disposed near the poles of the mold cavity.

12. A method of forming a golf ball cover according to claim 11 wherein the retractable pins are disengaged from the golf ball core before the injected cover material comes into contact with them.

13. A method of forming a golf ball cover according to claim 10 wherein the primary source of cover material is a hot runner system.

14. A method of forming a golf ball cover according to claim 10 wherein the cover material from the primary source is supplied to the secondary runner through a melt flipper.

15. An injection mold for producing golf balls, comprising:
   a first mold plate defining a first cavity having a substantially hemispherical inner surface including a plurality of protrusions to form dimples on the outer surface of the golf ball terminating in a first parting line surface;
   a second mold plate defining a second cavity having a substantially hemispherical inner surface including a plurality of protrusions to form dimples on the outer surface of the golf ball terminating in a second parting line surface, wherein the cavities of said mold plates form a substantially spherically shaped mold cavity;
   a branched runner system in said mold plates terminating at said mold cavity, wherein said runner system comprises a secondary runner disposed around the mold cavity and in communication with a primary runner by at least one melt flipper.

16. The injection mold of claim 15 wherein said parting lines form a ring gate that is a substantially continuous annular opening around a substantial portion of the mold cavity.

17. The injection mold of claim 15 wherein said parting lines form a plurality of edge gates.

18. The injection mold of claim 1, further comprising a melt flipper to communicate the primary supply of cover material with the secondary runner.

19. The injection mold of claim 1, wherein the primary supply comprises a hot runner.

20. The injection mold of claim 1, wherein the ring gate is profiled to enhance the flow profile of the cover material as it fills the mold.

21. The injection mold of claim 20, wherein the ring gate has a tapered profile.

22. The injection mold of claim 20, wherein the ring gate has a radius edge profile.

23. The injection mold of claim 4 wherein the ring gate is disposed approximately at the equator of the spherically shaped mold cavity.

* * * * *